(12) United States Patent
Wang

(10) Patent No.: US 9,702,471 B1
(45) Date of Patent: Jul. 11, 2017

(54) ATTACHMENT FOR DIFFERENT AIR VALVE

(71) Applicant: Beto Engineering & Marketing Co., Ltd., Taichung (TW)

(72) Inventor: Lo Pin Wang, Taichung (TW)

(73) Assignee: Beto Engineering & Marketing Co., Ltd., Beitun, Taichung (TW)

( * ) Notice: Subject to any disclaimer, the term of this patent is extended or adjusted under 35 U.S.C. 154(b) by 0 days.

(21) Appl. No.: 15/079,336

(22) Filed: Mar. 24, 2016

(51) Int. Cl.
*F16K 15/20* (2006.01)
*F04B 33/00* (2006.01)

(52) U.S. Cl.
CPC ............ *F16K 15/20* (2013.01); *F04B 33/005* (2013.01); *Y10T 137/3584* (2015.04); *Y10T 137/3724* (2015.04)

(58) Field of Classification Search
CPC ........... Y10T 137/3584; Y10T 137/353; Y10T 137/3724; Y10T 137/5196; Y10T 137/5283; F16K 15/205; F16K 31/602; F16K 11/04; F16K 1/04; F16K 3/262; F16K 3/267; F16K 15/20; F04B 33/005; F16L 37/28; B60S 5/04; B60C 29/06; B60C 29/064; B60C 23/10
USPC ......... 137/223, 231; 152/415, 421; 251/251, 251/258; 417/511
See application file for complete search history.

(56) References Cited

U.S. PATENT DOCUMENTS

| | | | |
|---|---|---|---|
| 5,645,100 A | 7/1997 | Chuang et al. | |
| 5,683,234 A | 11/1997 | Chuang et al. | |
| 5,749,392 A | 5/1998 | Glotin | |
| 6,105,600 A | 8/2000 | Wang | |
| 6,105,601 A | 8/2000 | Wang | |
| 6,146,116 A | 11/2000 | Wu et al. | |
| 6,289,920 B1 | 9/2001 | Wang | |
| 6,328,057 B1 | 12/2001 | Wang | |
| 6,843,270 B1* | 1/2005 | Wang | B60S 5/04 137/223 |
| 7,866,335 B2 | 1/2011 | Wang | |
| 9,016,304 B2* | 4/2015 | Wang | F16K 15/20 137/223 |
| 9,133,970 B2* | 9/2015 | Wang | F16L 37/28 |
| 9,297,464 B1* | 3/2016 | Wang | F16K 15/20 |
| 9,387,738 B2* | 7/2016 | Wang | F04B 33/005 |
| 9,388,914 B2* | 7/2016 | Wang | F16K 31/602 |

* cited by examiner

*Primary Examiner* — Craig J Price
(74) *Attorney, Agent, or Firm* — Charles E. Baxley

(57) ABSTRACT

An air valve connecting device or attachment includes a casing extended from a housing, a mouth engaged in the casing and having a compartment for engaging with either a US or French inflation valve, a follower slidably engaged in the casing and the housing and engageable with the mouth for compressing the mouth to grasp either of the inflation valves, a tube slidably engaged in the follower and extendible into the mouth, an actuator engaged in the housing and having a space for engaging with the follower, and the actuator includes a cam member for engaging with the follower and for forcing the follower to compress the mouth and to grasp either of inflation valves to the casing.

12 Claims, 8 Drawing Sheets

ATTACHMENT FOR DIFFERENT AIR VALVE

BACKGROUND OF THE INVENTION

1. Field of the Invention

The present invention relates to an air valve connecting head or device or attachment, and more particularly to an air valve connecting device or attachment including an improved structure for easily and quickly connecting to different inflation valves without removing and changing the parts or elements or structure of the air valve connecting attachment.

2. Description of the Prior Art

Typical air valve connecting devices or attachments comprise one or more fitting ports or mouths formed or provided in a valve housing for receiving or engaging with inflation valves or nozzles and for selectively inflating various kinds of balls, inner tires of the bicycles or the motorcycles or the vehicles, or other inflatable articles. Normally, the inflation valves or nozzles may comprise different structures, such as the U.S. type inflation valve or the French type inflation valve, or the like for inflating different tires of the bicycles or the motorcycles or the vehicles.

For example, U.S. Pat. No. 5,683,234 to Chuang et al., U.S. Pat. No. 5,645,100 to Chuang et al., U.S. Pat. No. 5,749,392 to Glotin, U.S. Pat. No. 6,105,600 to Wang, U.S. Pat. No. 6,105,601 to Wang, U.S. Pat. No. 6,146,116 to Wu et al., U.S. Pat. No. 6,289,920 to Wang, U.S. Pat. No. 6,328,057 to Wang, and U.S. Pat. No. 7,866,335 to Wang disclose several of the typical hand operated, dual chambered, pneumatic pumps comprising a fitting member or attachment for selectively or alternatively engaging with different nozzles or tire valves, such as the U.S. type inflation valve or the French type inflation valve, or the like.

However, the typical air valve connecting heads or fittings or attachments comprise a structure that may not be easily operated by the user or may not effectively grasping or holding the different inflation valves, and may have an air leaking problem occurred through either the inflation valve or the attachment.

The present invention has arisen to mitigate and/or obviate the afore-described disadvantages of the conventional air valve connecting devices or attachments.

SUMMARY OF THE INVENTION

The primary objective of the present invention is to provide an air valve connecting device or attachment including an improved structure for easily and quickly connecting to different inflation valves without changing the parts or elements or structure of the air valve connecting attachment.

In accordance with one aspect of the invention, there is provided an air valve connecting device comprising a housing including a chamber formed therein for receiving a pressurized air, and including a casing extended from the housing and including a pathway formed in the casing and communicating with the chamber of the housing, a mouth made of soft or resilient materials and engaged in the casing, and including a compartment formed in the mouth for resiliently engaging with or grasping either a first inflation valve or a second inflation valve, a follower slidably received and engaged in the pathway of the casing and the chamber of the housing and engageable with the mouth, for selectively compressing the mouth to grasp either the first or the second inflation valves, and the follower including a bore formed therein, a tube slidably engaged in the bore of the follower for selectively engaging with the second inflation valve, and extendible into the compartment of the mouth for selectively engaging with the first type valve, an actuator including a first end portion rotatably engaged in the housing, and including a second end portion, and including a space formed in the first end portion of the actuator for slidably and rotatably receiving and engaging with the follower, and the actuator including a cam member provided in the space of the actuator for selectively engaging with the follower and for selectively forcing and moving the follower to compress the mouth and to grasp either the first inflation valve or the second inflation valve to the casing and for easily and quickly connecting to different inflation valves without changing the parts or elements or structure of the air valve connecting attachment.

The follower includes an engaging element formed in the follower for selectively engaging with the cam member of the actuator and for allowing the cam member of the actuator to selectively engage with the follower and to force and move the follower to compress the mouth and to grasp either the first or the second inflation valves when the actuator is rotated relative to the housing. The engaging element of the follower is selected from an opening formed in the follower and communicating with the bore of the follower for receiving or engaging with the cam member of the actuator.

The actuator includes a bore formed therein, and includes a partition extended into the bore of the actuator for forming the space in the first end portion of the actuator, and the space of the actuator is opened outwardly for slidably and rotatably receiving and engaging with the follower. The actuator includes an entrance formed in the partition of the actuator and communicating with the bore and the space of the actuator for allowing the pressurized air to flow through the entrance of the partition and into the space of the actuator.

The actuator includes a cap attached to the second end portion of the actuator and having a passage formed in the cap for allowing the pressurized air to flow through the passage of the cap and into the space of the actuator. The actuator includes a check valve engaged in the bore of the actuator for guiding and controlling the pressurized air to flow from the passage of the cap into the bore of the actuator only and for preventing the pressurized air from flowing out from the bore of the actuator through the passage of the cap or out to the environment.

The follower includes a spring biasing member engaged with the tube for biasing and forcing the tube into the compartment of the mouth. The tube includes a cavity formed therein for receiving and engaging with the spring biasing member. The follower includes a lid attached to the follower and engaged with the spring biasing member for retaining the tube and the spring biasing member in the bore of the follower.

The mouth includes a peripheral flange extended into the compartment of the mouth for engaging with the first inflation valve and for anchoring the first inflation valve to the mouth, and for forming an orifice in the peripheral flange and for allowing the second inflation valve to engage through the orifice of the peripheral flange and then to engage into the bore of the follower. The housing includes a cover attached to the casing and engaged with the mouth for securing the mouth to the casing, and the cover includes an aperture formed therein and aligned with the compartment of the mouth for receiving or engaging with the inflation valves.

Further objectives and advantages of the present invention will become apparent from a careful reading of the detailed

3 description provided hereinbelow, with appropriate reference to the accompanying drawings.

DETAILED DESCRIPTION OF THE PREFERRED EMBODIMENT

Figure 1:
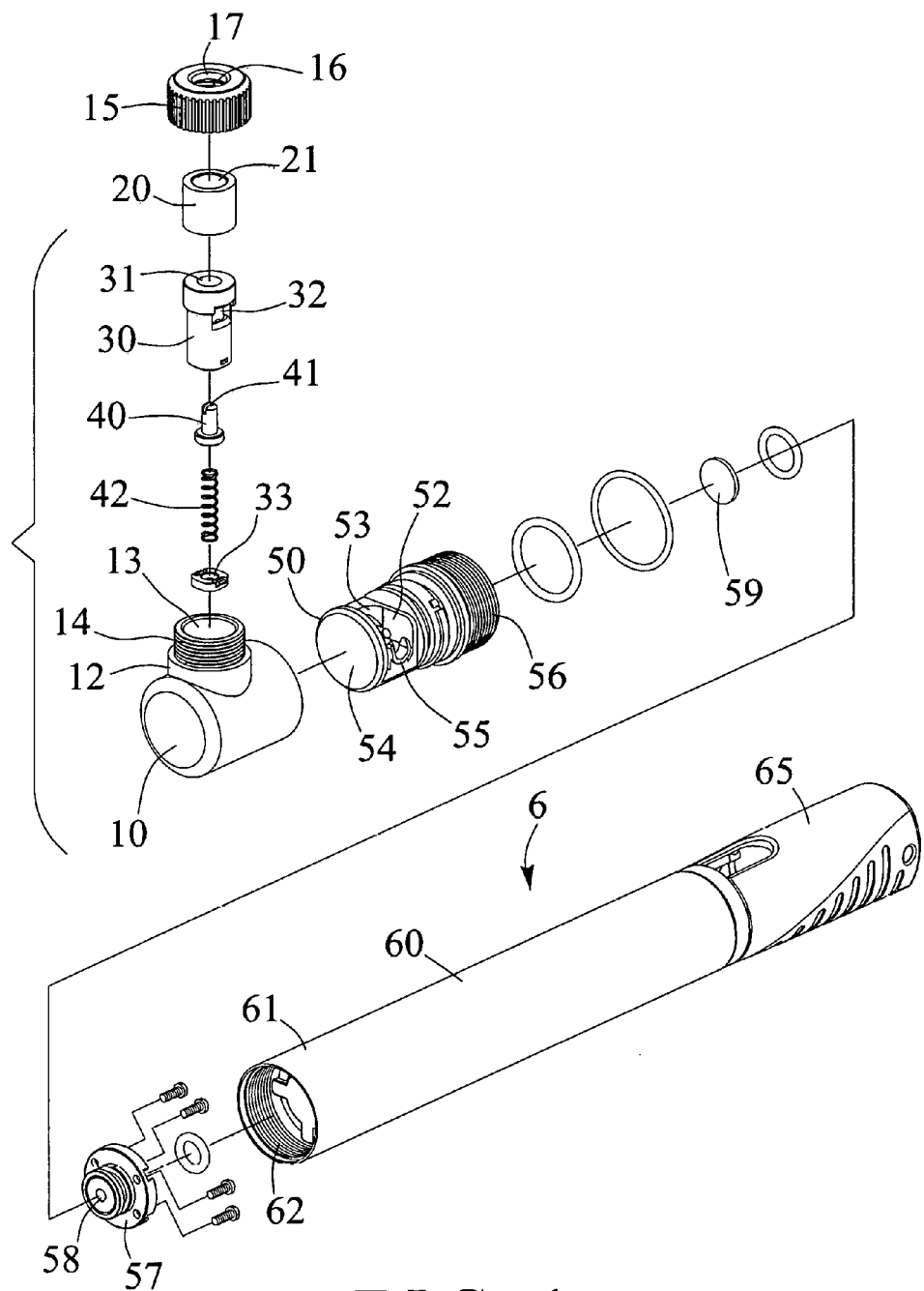
FIG. 1 is an exploded view of an air valve connecting device or attachment in accordance with the present invention.

Referring to the drawings, and initially to FIGS. 1-4, an air valve connecting device or attachment in accordance with the present invention comprises a head body or outer housing 10 including a chamber 11 formed therein, and including a stud or cylindrical casing 12 laterally extended from the housing 10 and substantially perpendicular to the housing 10, and including a pathway 13 formed in the casing 12 and communicating with the chamber 11 of the housing 10, and including an outer thread 14 formed in the outer peripheral portion of the casing 12. An elastic grasping member or mouth 20 is to be attached or engaged into the casing 12, and includes a compartment 21 formed in the mouth 20 (FIGS. 1 and 3-10) for receiving or engaging with either of the inflation valves 80, 88.

A cover 15 includes an inner thread 16 formed therein for engaging with the outer thread 14 of the casing 12 and for detachably attaching or securing the cover 15 to the casing 12, and the cover 15 may be engaged with the mouth 20 for solidly anchoring or securing the mouth 20 to the casing 12. The cover 15 includes an aperture 17 formed therein and having an inner diameter equal to or greater than or no less than that of the compartment 21 of the mouth 20 (FIGS. 3-9) for receiving or engaging with the inflation valves 80, 88, such as the first or U.S. type inflation valve 88 (FIGS. 4-6) and the second or French type inflation valve 80 (FIGS. 7-9), and for allowing the inflation valves 80, 88 to be engaged into the compartment 21 of the mouth 20, and thus for allowing the inflation valves 80, 88 to be resiliently grasped or held or secured to the casing 12 with the mouth 20 when the mouth 20 is compressed or actuated.

It is preferable that the mouth 20 is made of soft or elastic materials, such as rubber, plastic or other synthetic materials for resiliently grasping the inflation valves 80, 88 to the casing 12 when the mouth 20 is compressed to engage with and to compress or grasp either of the inflation valves 80, 88. It is further preferable that the mouth 20 includes a peripheral flange 22 extended radially and inwardly into the compartment 21 of the mouth 20 (FIG. 4) for contacting or engaging with the first or U.S. type inflation valve 88 (FIGS. 4-6) and for anchoring or retaining the first or U.S. type inflation valve 88 to the mouth 20 and the casing 12 of the housing 10, and for forming or defining an orifice 23 in the peripheral flange 22 and communicating with the compartment 21 of the mouth 20, and arranged for allowing the second or French type inflation valve 80 (FIGS. 7-9) to engage or extend through the orifice 23 of the peripheral flange 22 or of the mouth 20.

Figure 4:
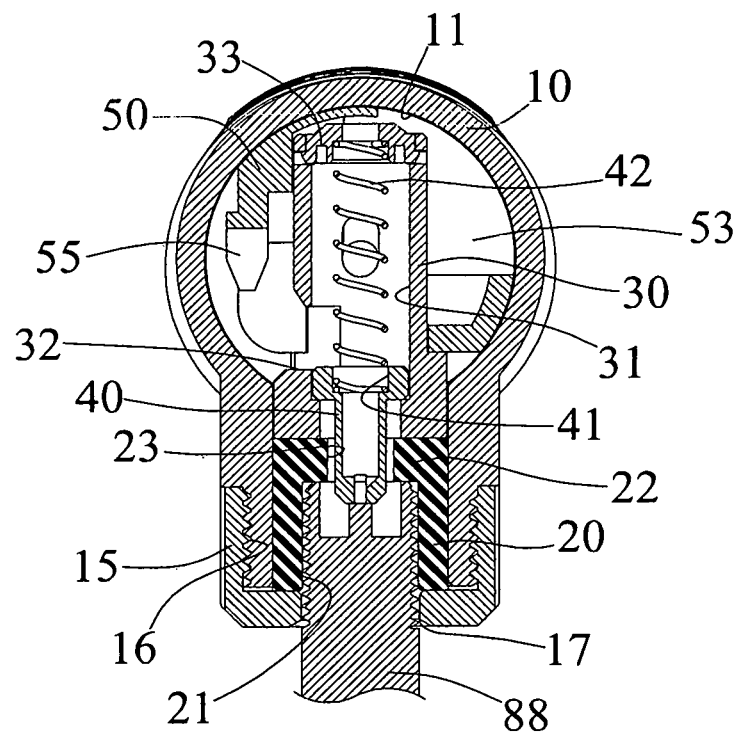
FIG. 4 is a cross sectional view of the air valve connecting device or attachment taken along lines 4-4 of FIG. 3.
Figure 5:
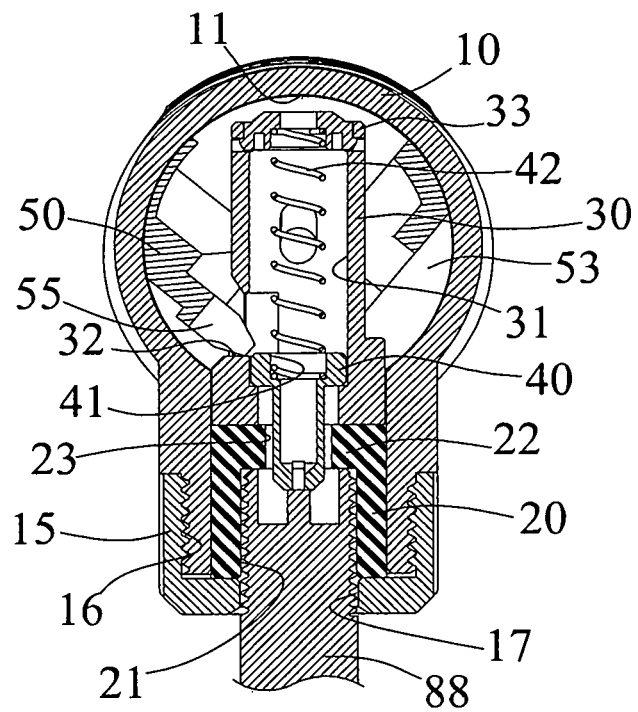
FIGS. 5, 6 are other cross sectional views similar to FIG. 4, illustrating the operation of the air valve connecting device or attachment for engaging with one type of the nozzles or tire valves.
Figure 6:
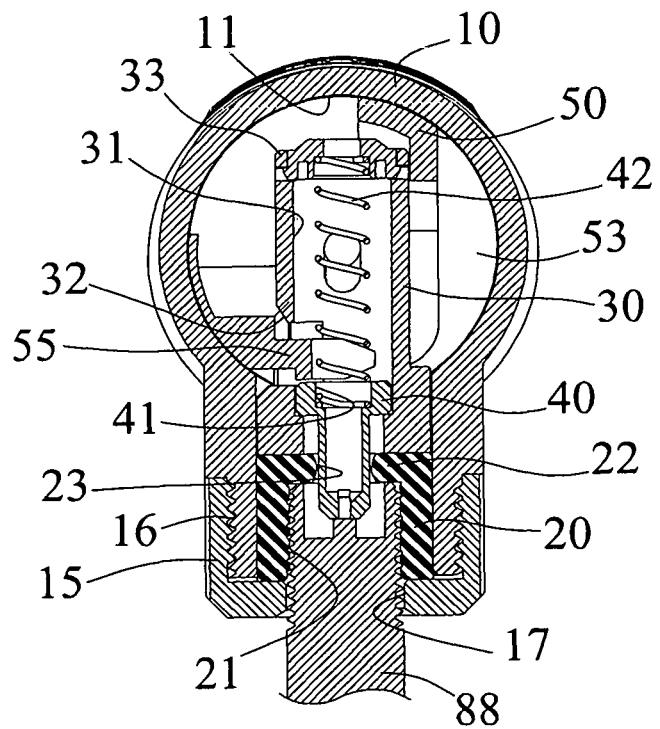

A cylindrical element or barrel or follower 30 is slidably received or engaged within the pathway 13 of the casing 12 and/or the chamber 11 of the housing 10, and contacted or engaged with the mouth 20 for selectively compressing or squeezing the mouth 20 to grasp or hold the inflation valves 80, 88, and includes a bore 31 formed therein and communicating with the orifice 23 of the peripheral flange 22 and/or the compartment 21 of the mouth 20, and includes an engaging element 32, such as an opening 32 formed in the follower 30 and communicating with the bore 31 of the follower 30. A valve pressing member or tube 40 is slidably engaged in the bore 31 of the follower 30 for selectively engaging with the French type inflation valve 80 (FIGS. 7-9), and is slidable or extendible into the orifice 23 of the peripheral flange 22 and/or the compartment 21 of the mouth 20 for selectively engaging with the U.S. type inflation valve 88 (FIGS. 4-6).

The tube 40 includes a cavity 41 formed therein for receiving or engaging with another spring biasing member 42 which is engaged with the follower 30 and/or engaged between the follower 30 and the tube 40 for selectively biasing or forcing the tube 40 into the bore 23 of the peripheral flange 22 and/or the compartment 21 of the mouth 20 and for selectively engaging with either the U.S. type inflation valve 88 or the French type inflation valve 80. The follower 30 may include a cap or lid 33 attached or mounted or secured to the follower 30 and contacted or engaged with the spring biasing member 42, or the lid 33 is formed integral with follower 30 and contacted or engaged with the spring biasing member 42 for anchoring or retaining the tube 40 and the spring biasing member 42 within the bore 31 of the follower 30.

Another cylindrical element or actuator 50 includes a first end portion or front portion 54 pivotally or rotatably engaged into the chamber 11 of the housing 10, and includes a bore 51 formed therein (FIG. 3), and includes a plate or partition 52 extended into the bore 51 of the actuator 50 and for forming or defining a compartment or space 53 in the first end portion or front portion 54 of the actuator 50, in which the front portion 54 of the actuator 50 is pivotally or rotatably engaged into the chamber 11 of the housing 10, and the space 53 of the actuator 50 is opened outwardly (FIG. 1) for slidably and pivotally or rotatably receiving or engaging with the follower 30 which may anchor or retain or position the front portion 54 of the actuator 50 within the chamber 11 of the housing 10, and which may prevent the actuator 50 from being moved axially relative to the housing 10 and from being disengaged or separated from the housing 10, and which may guide and limit the actuator 50 to pivot or rotate relative to the housing 10.

As shown in FIG. 1, the actuator 50 includes an actuating element or cam member 55 formed or provided in the space 53 of the actuator 50 and having a substantially U-shaped or horseshoe-shaped structure or configuration for selectively contacting or engaging with the follower 30 (FIGS. 4-5, 8-9) and for selectively forcing and moving the follower 30 to compress or squeeze the mouth 20 and to grasp or hold the inflation valves 80, 88 to the casing 12. When the cam member 55 of the actuator 50 is offset or spaced or separated from the follower 30 (FIGS. 4, 7) by pivoting or rotating the actuator 50 relative to the housing 10, the mouth 20 is not compressed or squeezed by the follower 30 for allowing the inflation valves 80, 88 to be engaged into the compartment 21 of the mouth 20 and/or to be engaged into the bore 31 of the follower 30.

Figure 7:
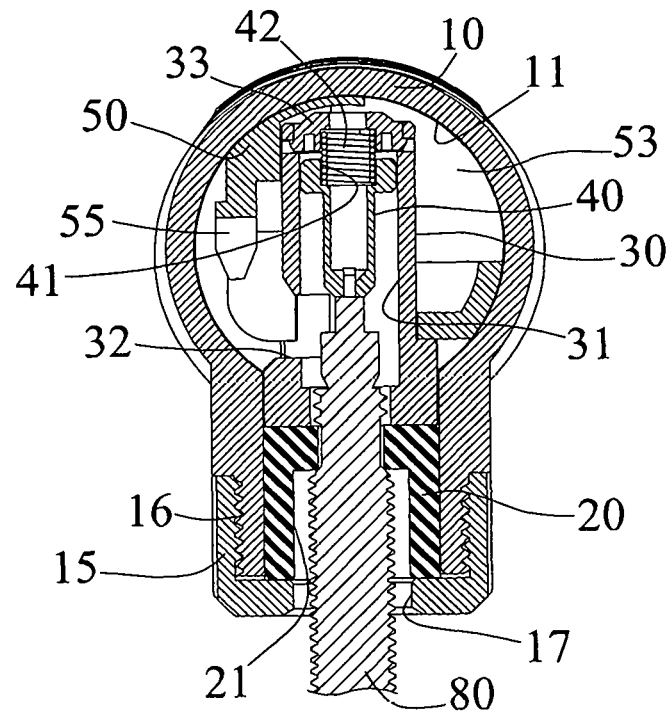
FIGS. 7, 8, 9 are further cross sectional views similar to FIGS. 4-6, illustrating the operation of the valve connecting device or attachment for engaging with different type of the nozzles or tire valves.
Figure 8:
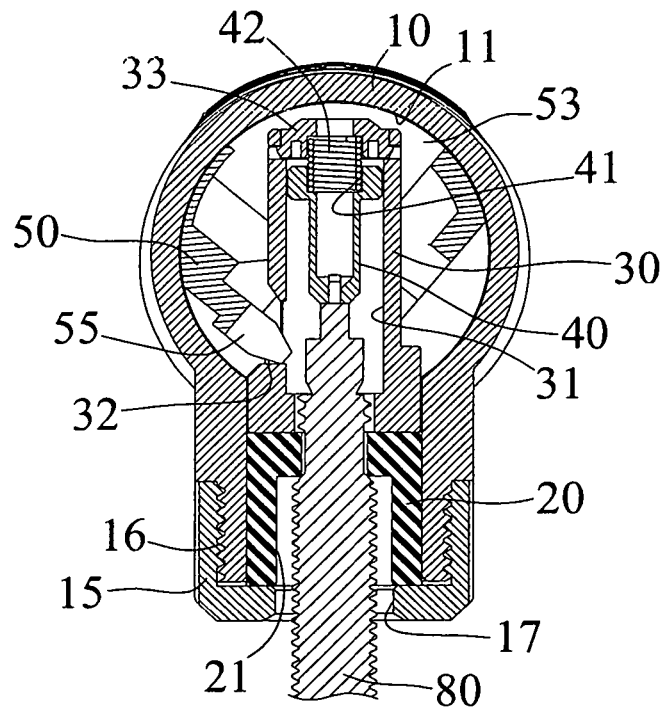
Figure 9:
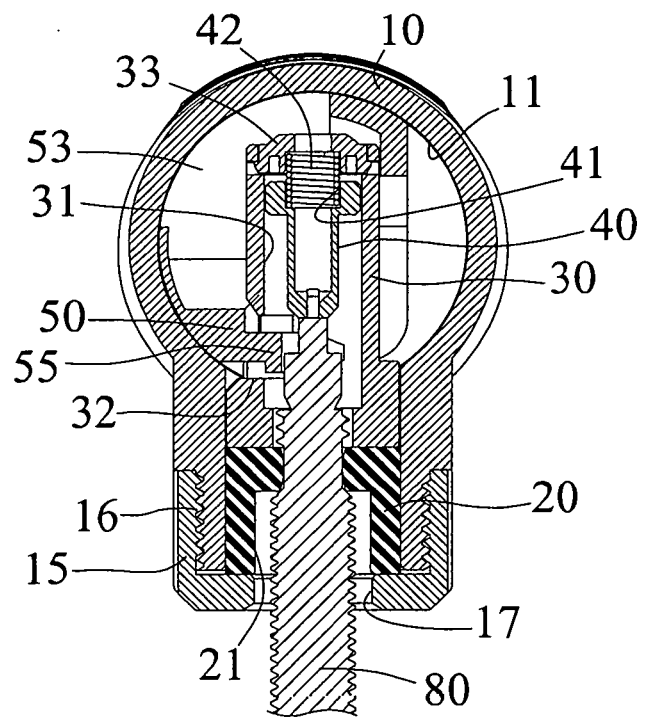

In operation, as shown in FIGS. 4-6, after the U.S. type inflation valve 88 is engaged into the compartment 21 of the mouth 20 (FIG. 4), the actuator 50 may be pivoted or rotated relative to the housing 10 to contact or engage with the follower 30 (FIGS. 5, 6) and to compress or squeeze the mouth 20 and to solidly engage with and to grasp or hold the U.S. type inflation valve 88 to the casing 12. Alternatively, as shown in FIG. 7, when the cam member 55 of the actuator 50 is offset or spaced or separated from the follower 30, the French type inflation valve 80 may be engaged into the compartment 21 of the mouth 20 and may also be engaged into the bore 31 of the follower 30, and may force the tube 40 to compress the spring biasing member 42. As shown in FIGS. 8-9, the actuator 50 may then be pivoted or rotated relative to the housing 10 to force and move the follower 30 to compress or squeeze the mouth 20 and to solidly engage with and to grasp the French type inflation valve 80 to the follower 30 and the casing 12.

Figure 2:
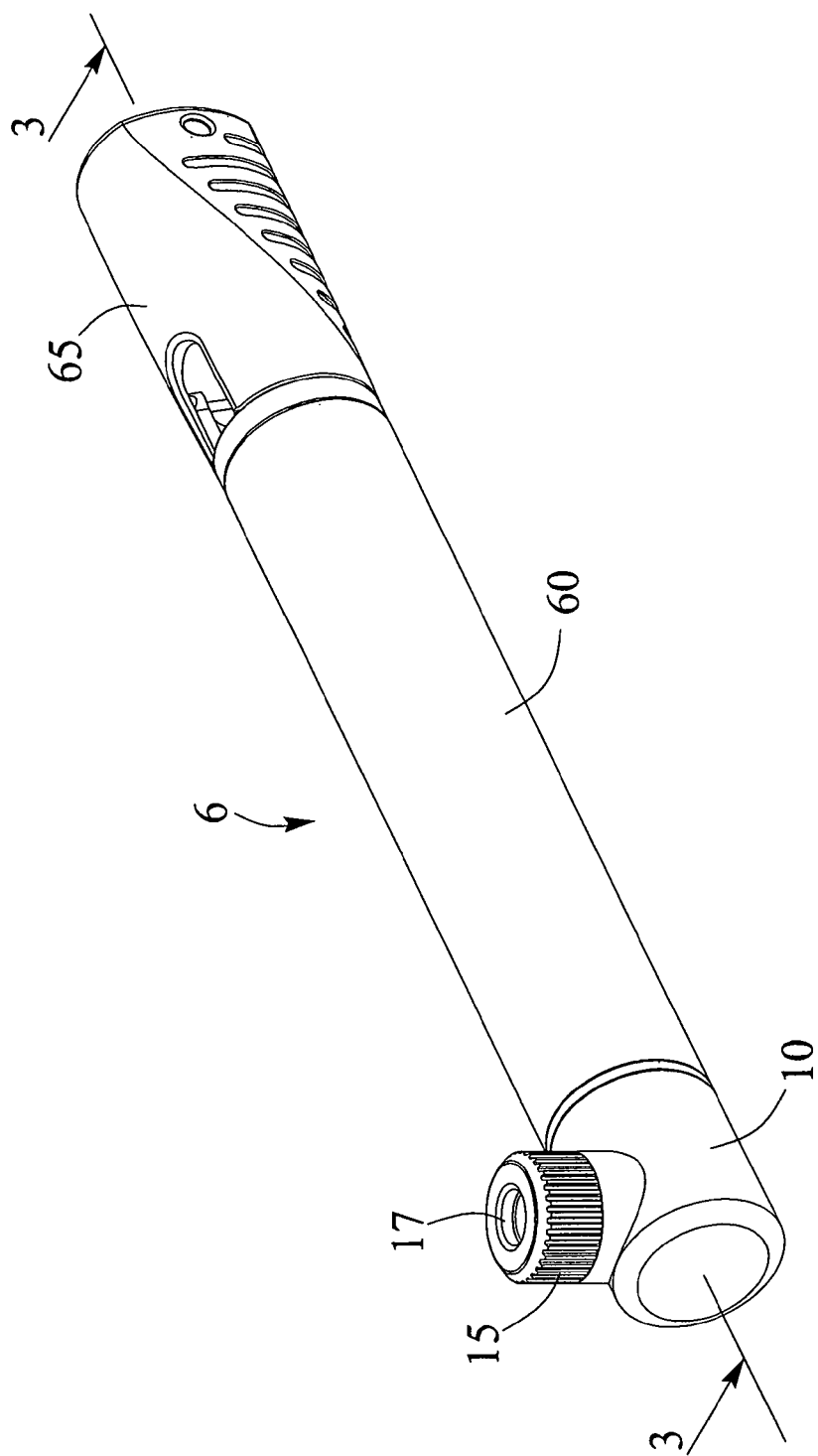
FIG. 2 is a perspective view of the air valve connecting device or attachment.
Figure 3:
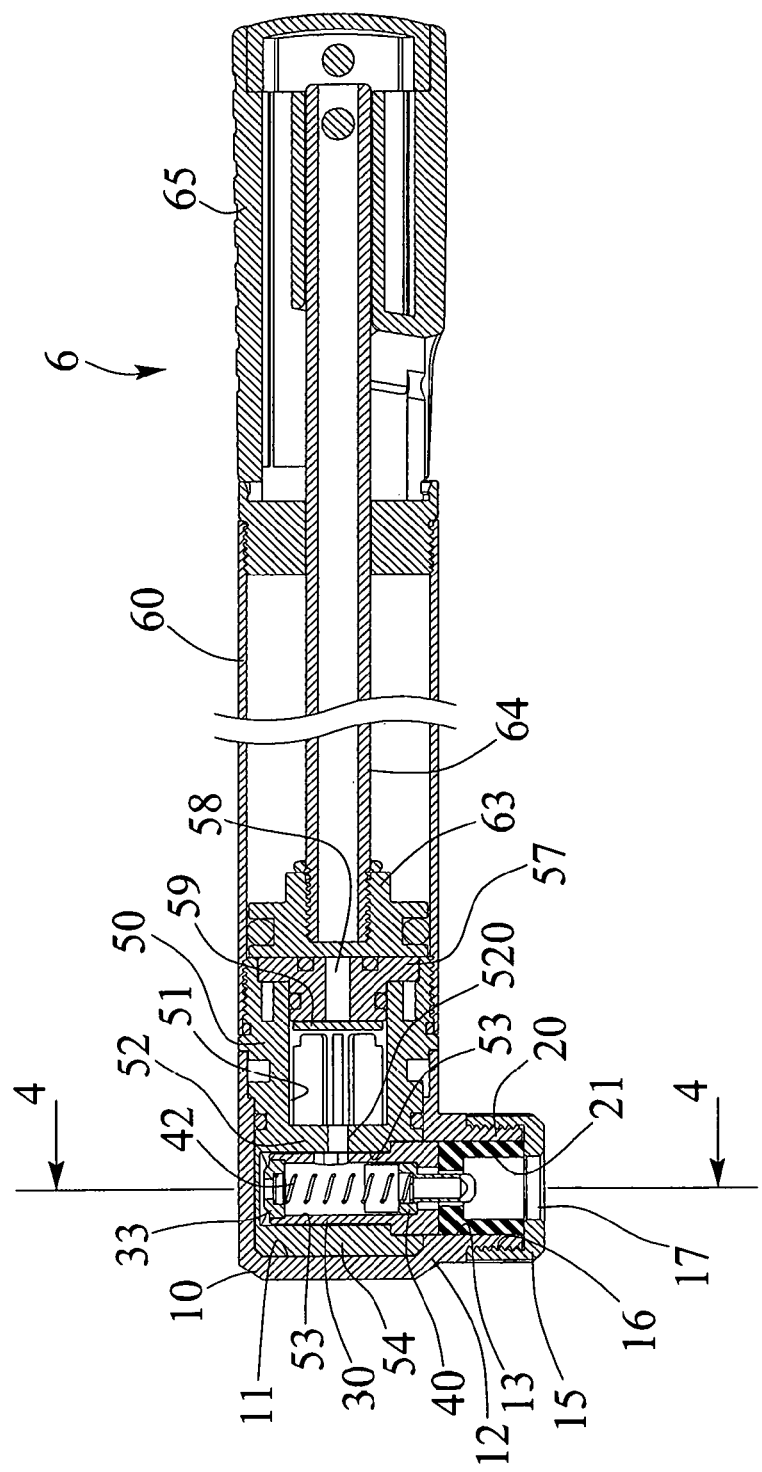
FIG. 3 is a cross sectional view of the air valve connecting device or attachment taken along lines 3-3 of FIG. 2.

As shown in FIGS. 1-3, the air valve connecting device or attachment in accordance with the present invention further comprises an air pump or hand pump 6 or the like attached or mounted or secured to the other or second end portion or rear portion 56 of the actuator 50 for supplying a pressurized air into the space 53 of the actuator 50 and then to flow into the bore 31 of the follower 30 and the compartment 21 of the mouth 20, and then for supplying the pressurized air to the inflation valves 80, 88 and to selectively inflate various kinds of balls, inner tires of the bicycles or the motorcycles or the vehicles, or other inflatable articles. The actuator 50 may include a lid or cap 57 attached or mounted or secured to the other or second end portion or rear portion 56 of the actuator 50 and having a passage 58 formed in the cap 57 for allowing the pressurized air to flow through the passage 58 of the cap 57 and into the space 53 of the actuator 50.

The partition 52 of the actuator 50 may include an inlet or entrance 520 (FIG. 3) formed therein and communicating with the bore 51 and the space 53 of the actuator 50 for allowing the pressurized air to flow through the entrance 520 of the partition 52 of the actuator 50 and thus for allowing the pressurized air to flow into the space 53 of the actuator 50. A check valve 59 is disposed or engaged into the bore 51 of the actuator 50 and contacted or engaged with the cap 57, or disposed or engaged between the cap 57 and the partition 52 for guiding and limiting or controlling the pressurized air to flow from outside into the bore 51 of the actuator 50 only and for preventing the pressurized air from flowing out of the bore 51 of the actuator 50, or out to the environment, or out of the passage 58 of the cap 57. The air pump 6 includes a barrel or sleeve 60 attached or mounted or secured to the other or second end portion or rear portion 56 of the actuator 50.

For example, the sleeve 60 of the hand pump 6 includes one or first end portion or front portion 61 attached or mounted or secured to the rear portion 56 of the actuator 50 with such as a threaded engagement 62 for allowing the front portion 61 of the sleeve 60 to be solidly and stably secured to the actuator 50 and moved in concert with the actuator 50, and thus for allowing the actuator 50 to be pivoted or rotated relative to the housing 10 with the sleeve 60. A piston 63 is slidably received or engaged within the sleeve 60, and a piston rod 64 is attached or mounted or secured to the piston 63 for moving the piston 63 along or relative to sleeve 60, and a knob or hand grip 65 is attached or mounted or secured to the piston rod 64 for being gripped or grasped or held by the user and for moving the piston rod 64 and the piston 63 relative to sleeve 60 and for generating the pressurized air and for supplying the pressurized air to flow through the passage 58 of the cap 57 and into the space 53 of the actuator 50.

Figure 10:
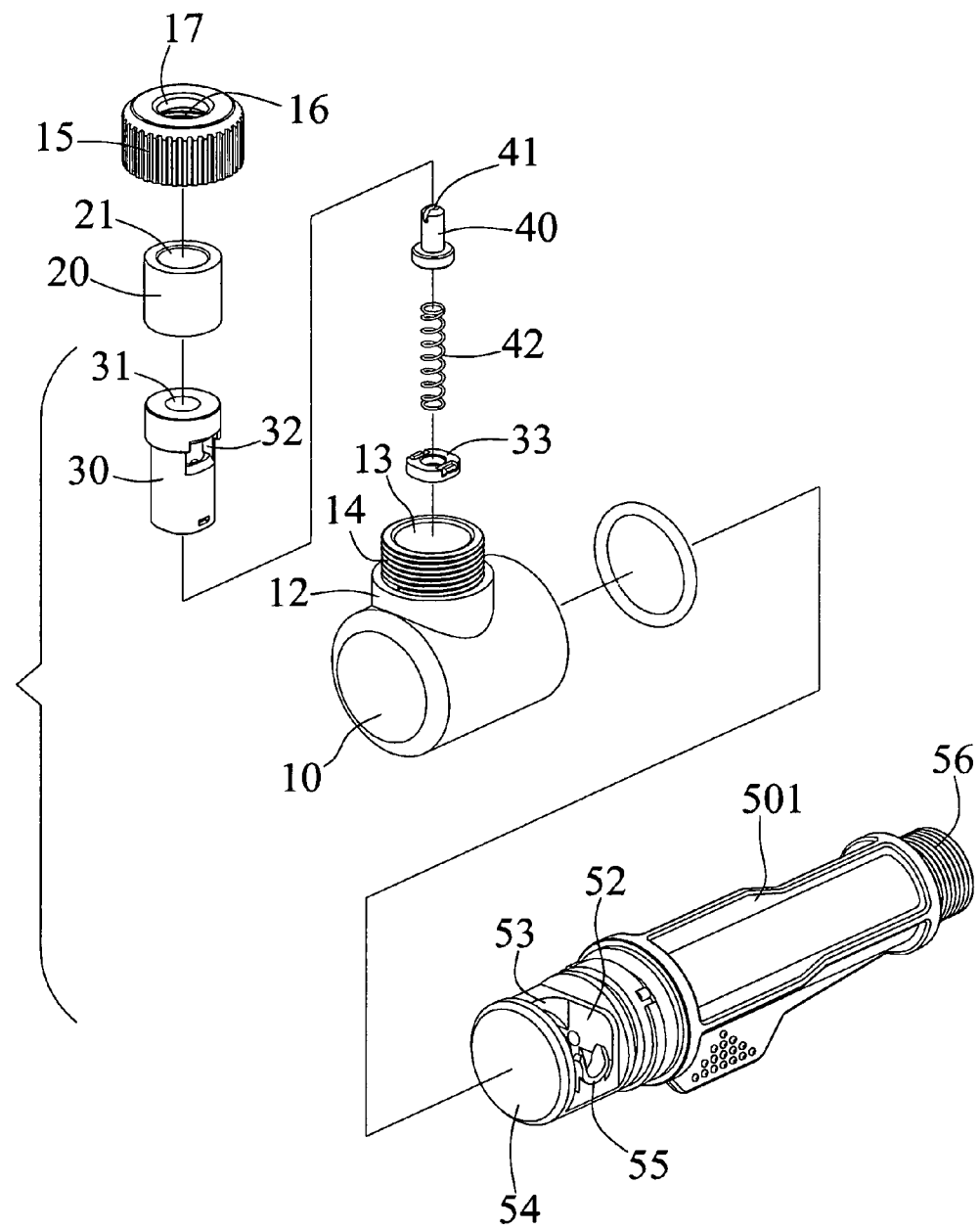
FIG. 10 is another exploded view similar to FIG. 1, illustrating the other arrangement of the valve connecting device or attachment.
Figure 11:
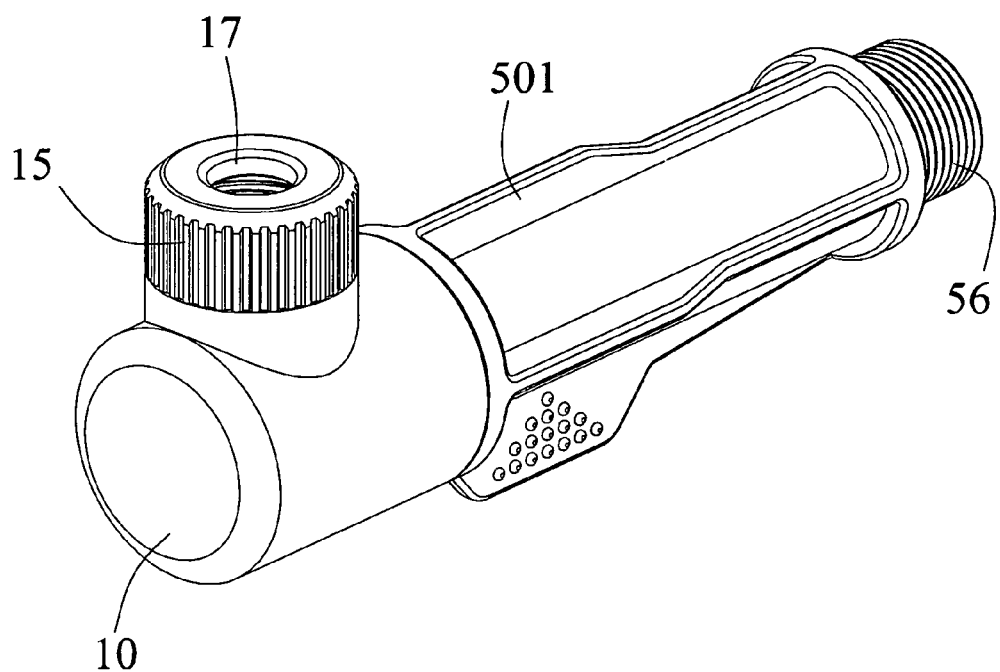
FIG. 11 is a perspective view of the air valve connecting device or attachment as shown in FIG. 10.

Alternatively, as shown in FIGS. 10 and 11, the actuator 501 may include a longer or greater length for being suitably gripped or grasped or held by the user, the rear portion 56 of the actuator 50 is also required to be connected or coupled to the air pump or hand pump 6 which may generate and supply the pressurized air to flow through the passage 58 of the cap 57 and into the space 53 of the actuator 50.

Accordingly, the air valve connecting device or attachment in accordance with the invention includes an improved structure for easily and quickly connecting different inflation valves without removing and changing the parts or elements or structure of the air valve connecting attachment.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
   a housing including a chamber formed in said housing for receiving a pressurized air, and including a casing extended from said housing and including a pathway formed in said casing and communicating with said chamber of said housing,
   a mouth engaged in said casing, and including a compartment formed in said mouth for engaging with either a first inflation valve or a second inflation valve,
   a follower slidably received and engaged in said pathway of said casing and said chamber of said housing and engageable with said mouth, for selectively compressing said mouth to grasp either said first or said second inflation valves, and said follower including a bore formed in said follower,
   a tube slidably engaged in said bore of said follower for selectively engaging with said second inflation valve, and extendible into said compartment of said mouth for selectively engaging with said first inflation valve,
   an actuator including a first end portion rotatably engaged in said housing, and including a second end portion, and including a space formed in said first end portion of said actuator for slidably and rotatably receiving and engaging with said follower, and said actuator including a cam member provided in said space of said actuator for selectively engaging with said follower and for selectively forcing and moving said follower to compress said mouth and to grasp either said first inflation valve or said second inflation valve to said casing.

2. The air valve connecting device as claimed in claim 1, wherein said follower includes an engaging element formed in said follower for selectively engaging with said cam member of said actuator and for allowing said cam member of said actuator to selectively force and move said follower to compress said mouth and to grasp either said first or said second inflation valves when said actuator is rotated relative to said housing.

3. The air valve connecting device as claimed in claim 2, wherein said engaging element of said follower is selected from an opening formed in said follower and communicating with said bore of said follower.

4. The air valve connecting device as claimed in claim 1, wherein said actuator includes a bore formed in said actuator, and includes a partition extended into said bore of said actuator for forming said space in said first end portion of said actuator, and said space of said actuator is opened outwardly for slidably and rotatably receiving and engaging with said follower.

5. The air valve connecting device as claimed in claim 4, wherein said actuator includes an entrance formed in said partition of said actuator and communicating with said bore and said space of said actuator for allowing the pressurized air to flow through said entrance of said partition and into said space of said actuator.

6. The air valve connecting device as claimed in claim 4, wherein said actuator includes a cap attached to said second end portion of said actuator and having a passage formed in said cap for allowing the pressurized air to flow through said passage of said cap and into said space of said actuator.

7. The air valve connecting device as claimed in claim 6, wherein said actuator includes a check valve engaged in said bore of said actuator for guiding and controlling the pressurized air to flow from said passage of said cap into said bore of said actuator only and for preventing the pressurized air from flowing out from said bore of said actuator through said passage of said cap.

8. The air valve connecting device as claimed in claim 1, wherein said follower includes a spring biasing member engaged with said tube for biasing and forcing said tube into said compartment of said mouth.

9. The air valve connecting device as claimed in claim 8, wherein said tube includes a cavity formed in said tube for receiving said spring biasing member.

10. The air valve connecting device as claimed in claim 8, wherein said follower includes a lid attached to said follower and engaged with said spring biasing member for retaining said tube and said spring biasing member in said bore of said follower.

11. The air valve connecting device as claimed in claim 1, wherein said mouth includes a peripheral flange extended into said compartment of said mouth for engaging with said first inflation valve and for anchoring said first inflation valve to said mouth, and for forming an orifice in said peripheral flange and for allowing said second inflation valve to engage through said orifice of said peripheral flange.

12. The air valve connecting device as claimed in claim 1, wherein said casing includes a cover attached to said casing and engaged with said mouth for securing said mouth to said casing.

* * * * *